(No Model.)
F. W. SEABURY.
DENTAL VULCANIZER.
No. 343,495. Patented June 8, 1886.
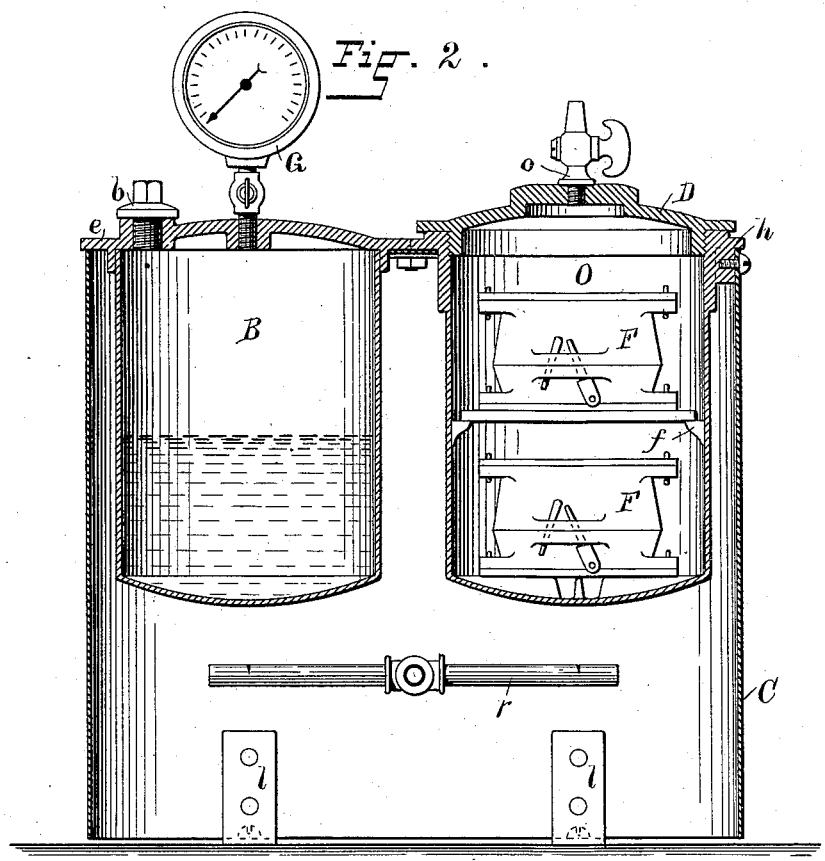
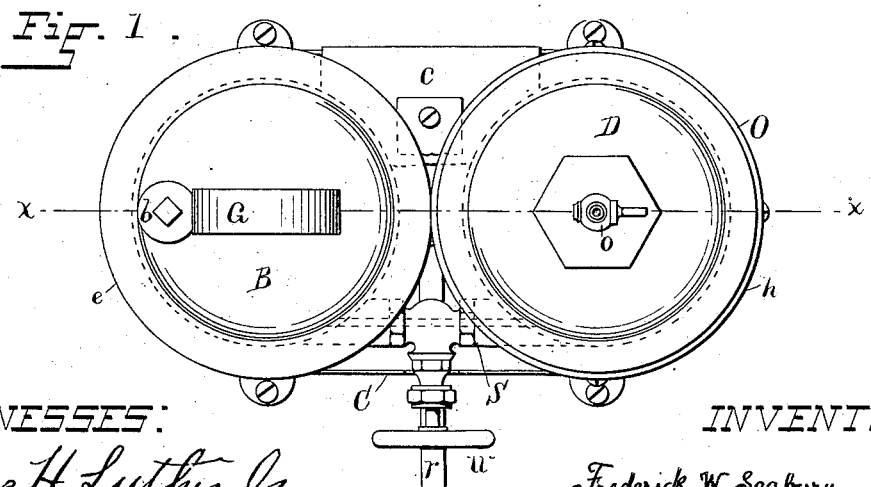
WITNESSES:
Chas. H. Luther Jr
Willis Fowler
INVENTOR:
Frederick W. Seabury
by Joseph A. Miller & Co
Attorneys

UNITED STATES PATENT OFFICE.

FREDERICK W. SEABURY, OF PROVIDENCE, RHODE ISLAND.

DENTAL VULCANIZER.

SPECIFICATION forming part of Letters Patent No. 343,495, dated June 8, 1886.

Application filed October 12, 1885. Serial No. 179,656. (No model.)

*To all whom it may concern:*

Be it known that I, FREDERICK W. SEABURY, of the city and county of Providence, and State of Rhode Island, have invented certain new and useful Improvements in Dental Vulcanizers, of which the following is a full, clear, and exact description, reference being had to the accompanying drawings, forming a part of this specification.

My invention relates to dental vulcanizing apparatus in which internal steam and external heat are used with the vulcanizing-oven.

The object of my invention is to provide a very simple and yet very efficient vulcanizer.

To the above purpose my invention is in the nature of the employment of a steam-generator, and a connecting vulcanizing-oven, placed side by side, with flames applied to both, as hereinafter described and claimed.

In the accompanying drawings, Figure 1 represents a top plan view of my improved vulcanizer. Fig. 2 represents a vertical sectional view of the same on line X X, Fig. 1.

In the said drawings like letters designate like parts.

The metallic casing C of the vulcanizer is provided with the cover c, (shown in Fig. 1 as partly broken away,) and has the L-shaped strips l l forming feet for the casing. The boiler B has a flange, e, around its top, and is provided with the feed-water pipe b and the steam-gage G. The oven O has the flange h extending around its top, and has its mouth screw-threaded for the reception of the screw-threaded cover D, from which cover leads the test-cock o. On the interior are the brackets f, to support the ordinary vulcanizing-flasks F. The boiler B and the oven O are placed side by side and connected, preferably near their tops, by the communicating pipe S, having a valve therein controlled by the wheel w. This pipe S is to admit the steam from the boiler into the oven as desired. The boiler and oven together are set down in the casing C, and their respective flanges e and h rest on the top edge of said casing and form a support for them. Beneath the boiler B and oven O is disposed the ordinary gas-burner, r, which supplies flames directly to the bottom of the boiler and the oven.

It is obvious that when the steam is admitted into the oven O, the oven being at a greater temperature than the steam, the steam is superheated and held in a very dry state, so that the process of vulcanization is rendered more perfect, because the moisture of the steam greatly injures and retards the said process.

My improved vulcanizer being of simple construction can be cheaply made. It is very durable, and from its arrangement is not easily deranged or injured.

Having thus described my invention, I claim as new and desire to secure by Letters Patent—

1. In a dental vulcanizer, the combination, with a mantle or casing, of a steam-generator and vulcanizing-chamber placed side by side and connected by a pipe, and both surrounded by the said casing, and both subjected to heat, for the purpose described.

2. The combination, with the steam-boiler B, of the vulcanizing-oven O, communicating therewith by the steam-pipe S, and the gas-burner r, placed beneath the said boiler and oven and supplying flames to both, for the purpose described.

3. The combination, with the boiler B, provided with supply-pipe b, and steam-gage G, and flange e, of the oven O, provided with a flange, h, and having the cover D, with the cock o, and of the supporting-casing C and the gas-burner r, substantially as described.

FREDERICK W. SEABURY.

Witnesses:
 JOSEPH A. MILLER,
 M. F. BLIGH.